Jan. 23, 1945.    A. RAPPL    2,367,797
GAUGING APPARATUS
Filed July 23, 1943    2 Sheets-Sheet 1

INVENTOR
ANTON RAPPL
BY
Bean, Brooks, Buckley & Bean.
ATTORNEYS

Jan. 23, 1945.  A. RAPPL  2,367,797
GAUGING APPARATUS
Filed July 23, 1943   2 Sheets-Sheet 2
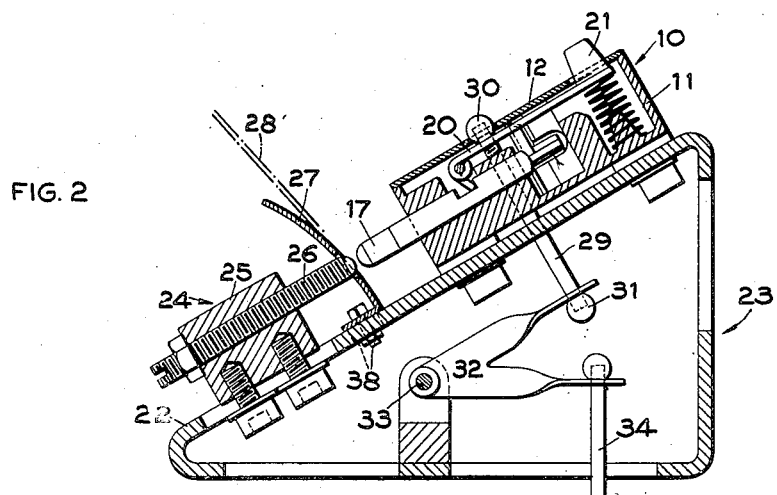
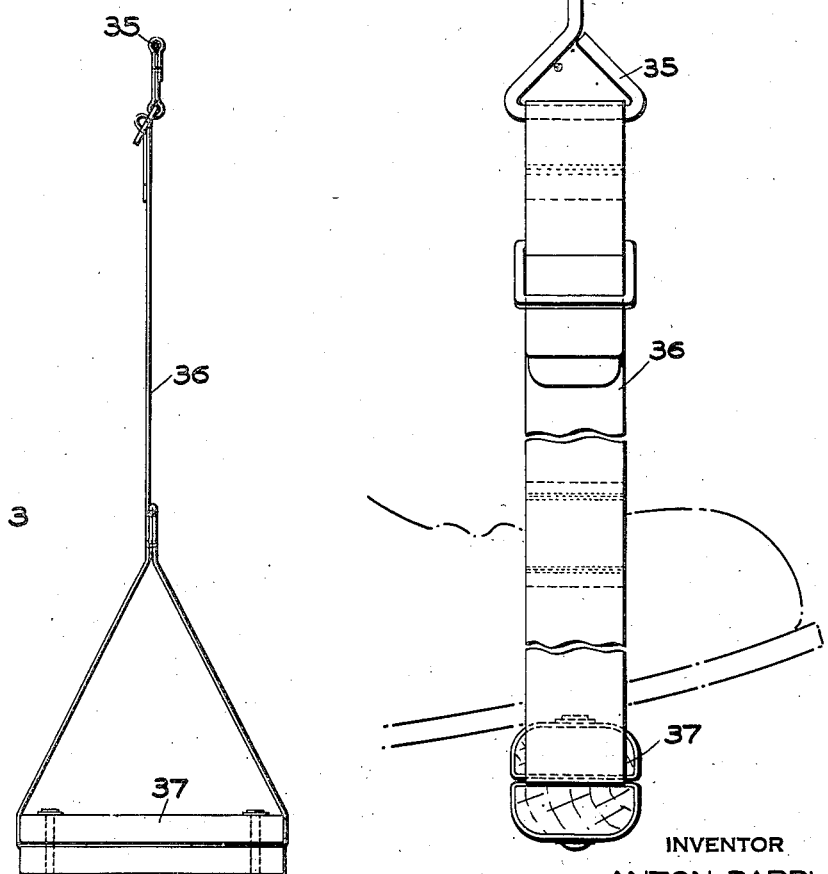
INVENTOR
ANTON RAPPL Patented Jan. 23, 1945

2,367,797

UNITED STATES PATENT OFFICE 2,367,797

GAUGING APPARATUS

Anton Rappl, Eggertsville, N. Y., assignor to Trico Products Corporation, Buffalo, N. Y.

Application July 23, 1943, Serial No. 495,853

5 Claims. (Cl. 33—147)

This invention relates to gauges and more particularly to a comparator type of gauge by which workpieces may be compared to a master or pattern in rapid order.

The object of the invention is to provide a gauge of the class described which is adapted for control in a manner which will leave the hands free for expeditiously handling the workpieces in large volume. A further object is to provide a gauging instrument which is of sturdy, practical, and economical construction, and efficient in operation.

In the accompanying drawings,

Fig. 2 is a sectional view; and

Fig. 3 is a detail view of the operating means therefor.

Figure 1:
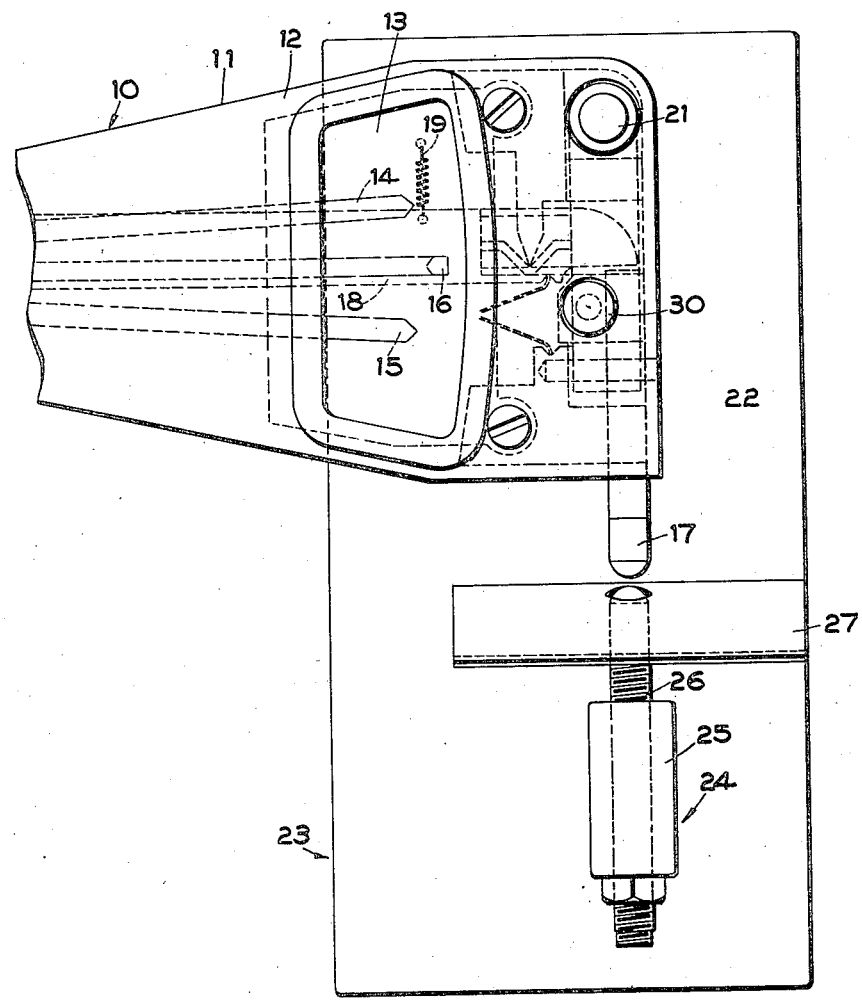
Fig. 1 is a plan view of the invention.

Referring more particularly to the drawings, the numeral 10 designates a micrometer gauge of the comparator type described in co-pending application Serial No. 441,614. The gauge comprises generally a housing 11 having a cover 12 with a window 13 therein through which plus or minus tolerance indicators 14 and 15 are visible. A pointer 16 operates beneath the window to indicate the dimensional characteristics of a workpiece relative to the plus or minus indicators and is operatively connected to a work engaging plunger 17 through an amplifying leverage generally indicated at 18. The plunger is spring projected by spring 19 but normally held retracted by a counteracting spring pressed lever device 20 which is rendered inoperative upon depressing a release button 21 to thereby permit the plunger to advance to perform the gauging function.

The gauge unit 10 is mounted on the inclined surface 22 of a triangular shaped table or base 23. An anvil 24 is also mounted on the inclined table surface and comprises a headstock 25 and a spindle 26 threaded therethrough for adjustment of its tip toward the plunger 17. The tip of the spindle 26 projects through an opening in a work guide 27 mounted on the base between the gauge unit 10 and the anvil. The anvil is adjustably mounted by a screw and slot connection indicated at 38.

The invention as described above is adapted for hand operation, as by placing a workpiece 28 on the guide 27 and sliding it down through the clearance between the plunger and the anvil spindle, and then depressing the button 21 to release the work engaging plunger for actuating the pointer 16 to indicate the dimensional characteristics of the workpiece.

With the above construction, the operator requires one hand constantly on the release button. To expedite the gauging operation the hand operation is eliminated. To this end a connecting link or rod 29 is operatively connected at one end by a swivel 30 to the plunger releasing lever 20. From the release lever the link 29 extends downwardly through the inclined table surface where it is connected by a swivel 31 to one arm of a bell crank 32 pivotally mounted at 33 on the base. The connection of the rod 29 to the arm motion transmitting member 32 is preferably at a point tangential to the arcuate travel of said arm during pivotal movement thereof. The other arm of the bell crank is provided with a depending rod 34 which terminates in a loop 35. Suspended from this loop by an adjustable strap 36 is a stirrup or floating treadle 37. This freely swingable foot treadle allows an operator to change the position of his foot during operation of the invention, thereby greatly increasing the comfort of the operator.

The bell crank between the plunger depressing link 29 and the strap supporting rod 34 provides a means whereby forces exerted thereon by the foot in the treadle are always transmitted to the release lever 20 in the same direction regardless of the angular displacement of the foot, thereby eliminating undue wear and any possible binding of the parts. The bell crank therefore constitutes a means for correcting any operative forces applied to the micrometer gauge while the floating treadle gives freedom and flexibility in the control which tends toward less fatigue and greater ease for the operator.

It will be apparent to those skilled in the art that the inventive principles involved are not necessarily limited thereto but that various changes may be made therein without departing from the spirit and scope of the appended claims.

I claim:

1. A gauging device comprising an indicator, a work engaging part supported on an incline for actuating said indicator, means for operating said work engaging part, means normally operative to hold said operating means inoperative, and treadle means for rendering said holding means inoperative, said treadle means comprising a pivotally mounted motion transmitting member, a connector connecting one part of said member and said holding means at a point tangential to the arcuate travel of said part, whereby the path of movement of said connector approximates a straight line, and a treadle suspended from another angularly disposed part of said member.

2. A gauging instrument comprising a base having an inclined table surface, an indicator mounted on said base, a spring pressed work engaging part movable on the base along the inclined table surface for actuating said indicator, means for holding said work engaging part inoperative, an anvil mounted on said base adjacent said work engaging part, a work guide member interposed between said anvil and said work engaging part, and a freely suspended treadle means for rendering said holding means inoperative to release said work engaging part to actuate said indicator.

3. A gauging instrument comprising a base having an inclined table surface, an indicator mounted on the table surface, a spring pressed work engaging part movable in a plane substantially parallel to the table surface for actuating said indicator, an anvil on said base adjustable axially of said part, said part being arranged above the anvil on the inclined table surface, and a work guide member adjustably mounted adjacent the anvil and at the lower side of the space intrevening said anvil and said work engaging part, said guide member comprising a plate upstanding on the inclined table surface and having an opening therethrough, and said anvil having a part extending through said opening to a point adjacent said work engaging part whereby a workpiece may be introduced therebetween for moving said work engaging part to actuate said indicator.

4. A gauging instrument comprising a micrometer gauge having a work engaging part, an anvil part opposing the work engaging part, said parts being disposed on an inclined axis and one part being movable along the axis, and means for moving the movable part toward and from the companion part, said means including a floating treadle flexibly suspended for free and unguided swinging movement, and a pivotal force transmitting member interposed between the suspended floating treadle and said movable part for modifying any depressing movement of the treadle and transmitting it to said movable part in a uniform direction.

5. A gauging instrument comprising an indicator, a spring pressed work engaging part movable along an inclined axis for actuating said indicator, means operable to so move said part and including a pull member, a lever operatively connected to said pull member, and a floating treadle freely suspended from the lever for unguided depressive movement, said pull member being mounted for movement at an angle to the perpendicular, and said lever serving to connect said treadle to said pull member for directing and confining any operative forces exerted upon said treadle to the said first means in a uniform direction.

ANTON RAPPL.